Sept. 14, 1965 A. F. JOHNSON 3,205,895
LOOSE-LEAF BINDING MECHANISM
Filed June 4, 1962 3 Sheets-Sheet 3

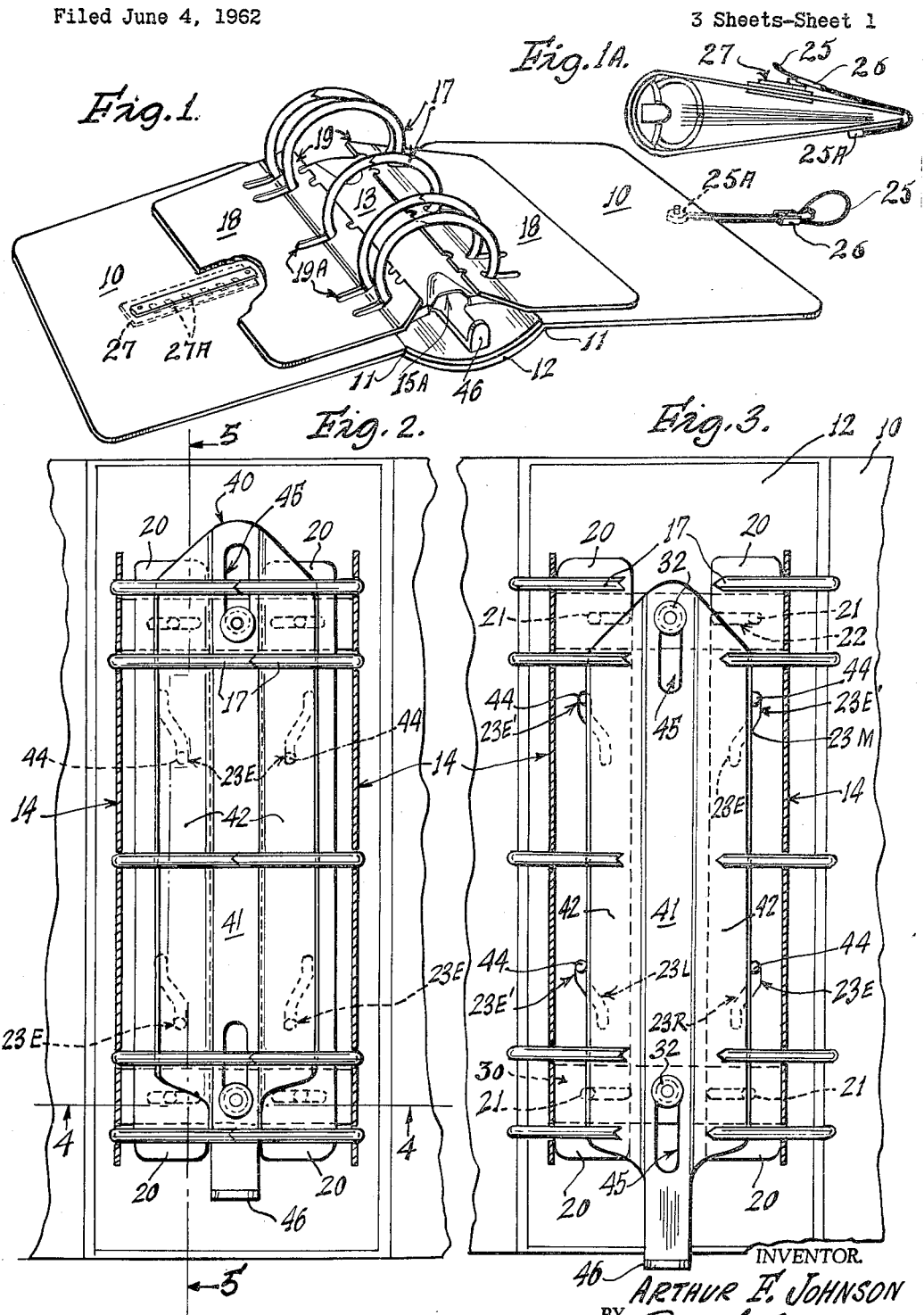

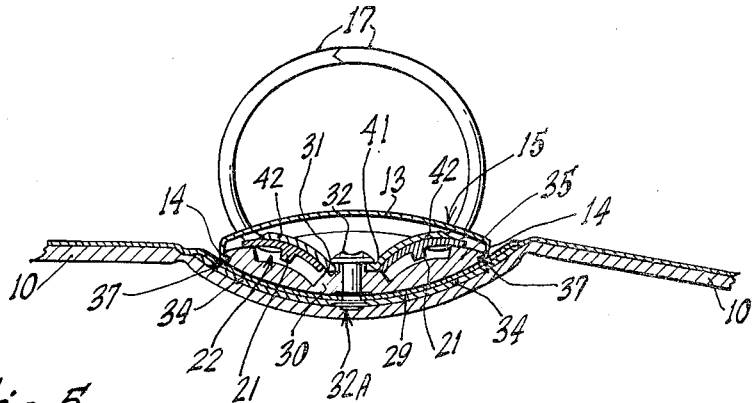
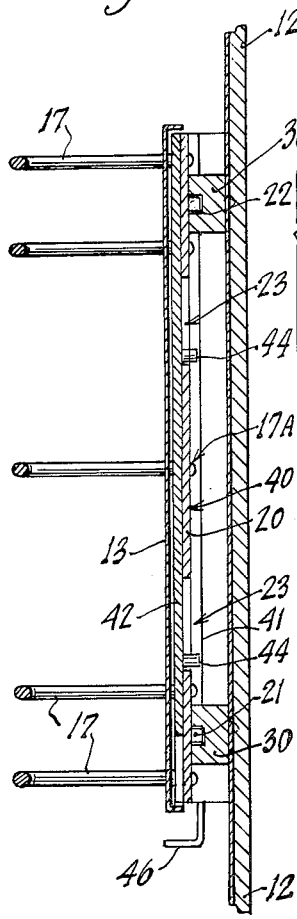
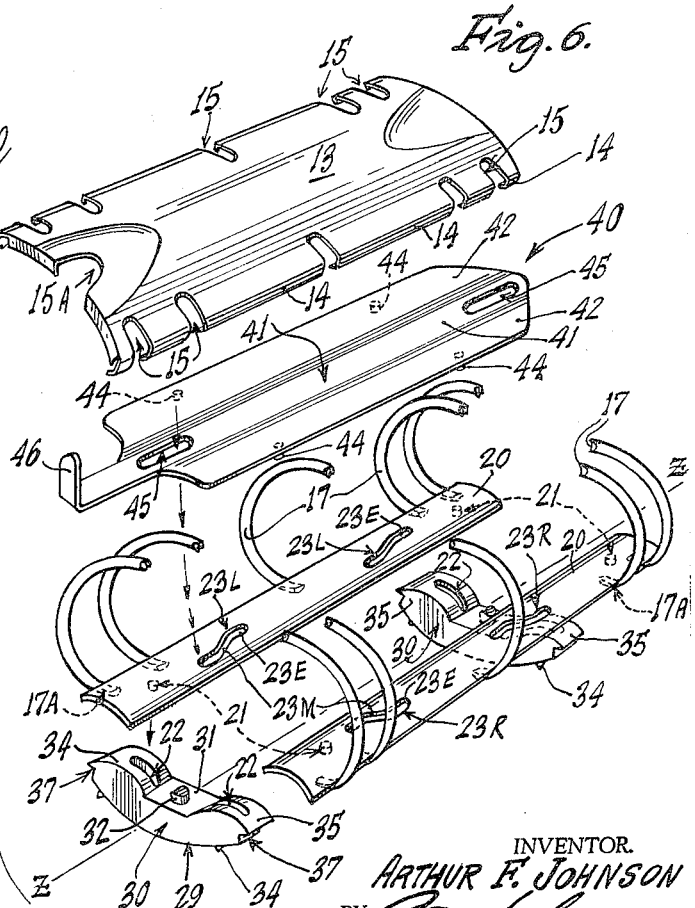

INVENTOR.
ARTHUR F. JOHNSON
BY
ATTORNEY.

United States Patent Office 3,205,895
Patented Sept. 14, 1965

3,205,895
LOOSE-LEAF BINDING MECHANISM
Arthur F. Johnson, Northbrook, Ill., assignor to Anderson Tool & Mfg. Co., Chicago, Ill., a corporation of Illinois
Filed June 4, 1962, Ser. No. 199,685
10 Claims. (Cl. 129—24)

This invention pertains to improvements in loose-leaf binders and provides a simple, economically produced, dependable binding mechanism of the split-ring variety affording, among other advantages, a maximum sheet capacity with an optimum throat opening or loading separation between the ends of the ring-forming prongs in their open condition as a result of moving separate arcuate prong-carrying plates on separate arcuate saddles so that each half of the ring (prong) shifts along its own arc of travel on a radius identical to that of its companion prong carrier, with attendant advantages including the fact that a small angular displacemnt of each carrier plate can produce a relatively large opening separation at the throat.

Binders of the split-ring type are extensively used to carry heavy page loads of cumulative reference material of all kinds, and the rings commonly reach a diameter of three inches and carry such a weight as to severely stress the prongs, the actuating mechanism, and the binder covers as well.

A suitable binding mechanism must occupy as little space as possible at the backbone of the binder, and must afford an easy and smooth opening and closing action when loaded to capacity, and must generally be manufacturable at a minimized price in order to be available to a wide variety of services at mass-production prices.

Problems and limitations in meeting these and other requirements increase in about a direct ratio to the capacity or diameter of the rings in a given binder, and one of the most troublesome of the limitations is the fact that increasing the larger ring diameter tends to decrease the available separation or throat opening between the ends of the prongs when opened to loading position, and various attempts have been made heretofore to overcome such limitations by changing the shape of the prongs, the character of their movement, whether pivotal, linear, or translatory, and so-on.

One prior arrangement shifts the prong carriers along a common convexly-curved bed, but this arrangement is unsuited to large diameter rings for the reason that if the large prongs are not to collide with the covers in moving outwardly the convex arc of the bed must have a relatively large radius of curvature which tends either to elevate the crown of this bed too high above the backbone to minimize the collision range, or the bed (and hence the shifting range of the carriers) must be too limited in width to permit substantial travel and separation of the prongs. The latter condition produces too small a throat opening, and the high crown obstructs the reading gutter or backbone zone and requires cover boards wider than acceptable to the trade.

According to the present disclosure very large ring diameters are rendered feasible by eliminating the common-arc type of bed or saddle shared by both prong carriers, and providing instead a separate saddle for each carrier on opposite sides of a central reference axis extending longitudinally along the backbone of the binder covers.

The disclosure therefore provides laterally-spaced dual arcuate saddles, one for each prong carrying plate, and these saddles preferably have a convex curvature and may have smaller but identical radii, with the advantage, among others, that the simultaneous but small angular shift of the carrier on the two arcs of smaller radius will produce a more rapid separation, and within limits, a wider range of separation, without rising high into the reading gutter, than is the case where both carriers have to shift along a common arc of greater radius, whether that common arc be convex or concave.

Additional aspects of distinction, novelty, and utility characterizing the presently disclosed mechanism relate to details of the structural embodiments and functional characteristics thereof which will be made to appear as the following description proceeds in view of the annexed drawings, in which:

FIG. 1 is a perspective view of the novel binder in open condition ready for loading:

FIG. 1-A is an end view to reduced scale of the binder in closed condition;

FIG. 2 is a fragmentary sectional view through the hood or cover plate taken to enlarged scale, and showing the binding mechanism in plan with the rings closed;

FIG. 3 is a view similar to that of FIG. 2 but showing the mechanism in actuated condition to open the rings;

FIG. 4 is a fragmentary vertical sectional detail to enlarged scale, taken along lines 4—4 of FIG. 2 with the cover plate in position;

FIG. 5 is a longitudinal vertical section taken along lines 5—5 of FIG. 2;

FIG. 6 is an exploded perspective of the binding mechanism of FIGS. 1 through 5;

Figure 9:
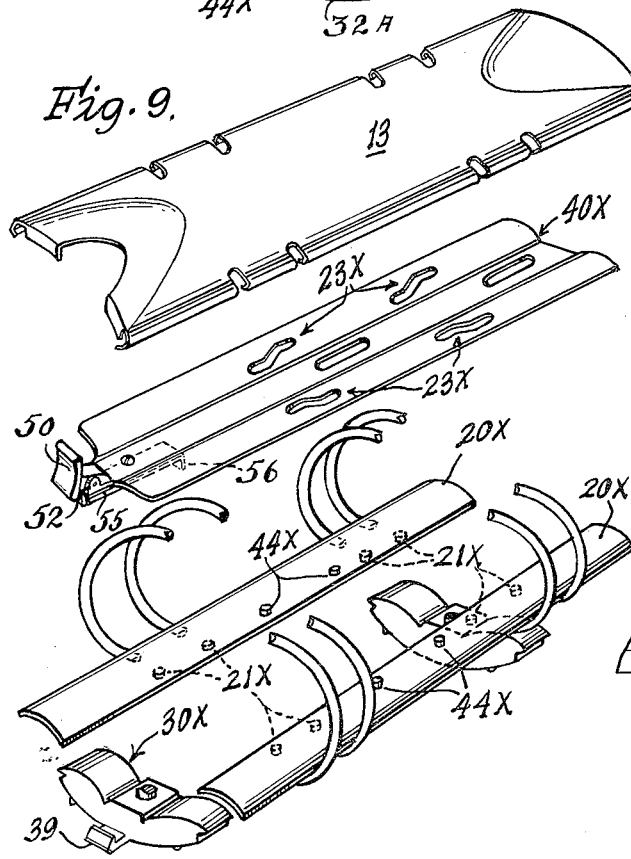
FIG. 9 is an exploded perspective showing the components of the modified binding mechanism of FIGS. 7 through 11.
Figure 11:
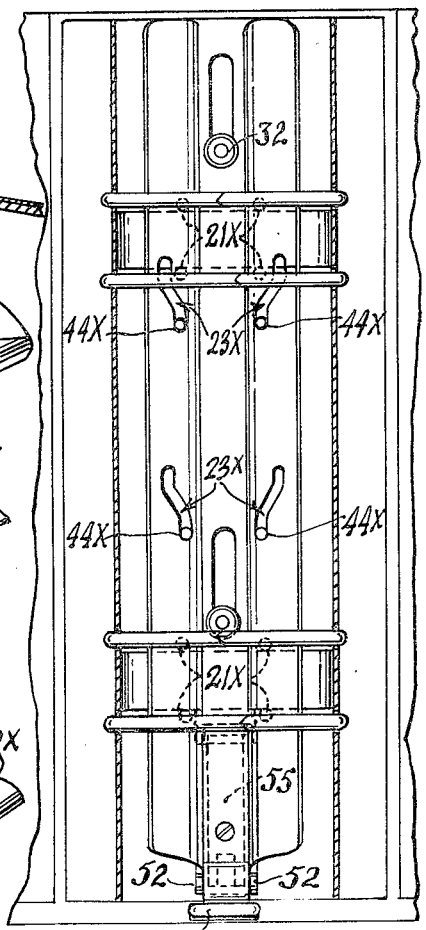
FIG. 11 is a fragmentary sectional view of the binder and modified binding mechanism showing the latter in plan.

In FIG. 1 the binding mechanism is shown mounted in a set of covers 10 hingedly joined at 11 to a curved backbone structure 12, the major portion of the mechanism being usually concealed, however, beneath a stamped hood or cover plate 13 of the construction shown in detail in FIGS. 6 or 9, from one end slot 15A of which projects an actuating lever 46 disposed at the foot of the backbone.

The several sets of binding prongs 17 are shown in closed condition without pages, but supplied with a pair of "sheet lifters" 18 in the form of heavy-guage fibre panels each having an upset hinge margin 19 with elongated slots 19A passing the prongs, the known function of such lifters being to facilitate the free flow of bound sheets over the rings in the opening and closing actions of the covers.

A major feature of the new mechanism is seen to advantage in FIGS. 3 and 6, and comprises mounting the ring-forming prongs 17 in mating sets, on respectively right and left convexly-curved prong carrier plates 20, which are identical except for the opposite pitching of their respective cam notches as hereafter explained.

Each binding prong has an offset foot 17A (FIG. 6) formed at its lower or anchored end flattened to fit against the underside of the corresponding carrier plate for attachment thereto by spot-welding to afford maximum strength with minimum bulk and obstruction in this region.

Each carrier plate is provided on its underside with a pair of depending guide studs 21 respectively adapted to fit into corresponding guide slots 22 cast in the saddle means which mounts said plates, as will more fully appear hereafter.

Each left and right carrier or prong plate is further provided with a pair of cam slots 23L or 23R of somewhat elongated S-shape with a middle portion 23M pitched somewhat crosswise of the long axis of the plate and leading at its opposite ends into substantially axially-extending endwise locking offsets 23E, the right-hand plate having the same shape of slot except that the diagonally pitched portions 23M thereof are pitched oppositely from like parts of the slots in the left-hand plate, so that the carriers can be converged and diverged by cam action to be described.

The pair of convexly-curved ring-carrying plates 20 is seated on a cooperative pair of axially-spaced dual saddle blocks 30 (FIGS. 4 and 6) of identical construction, each block being characterized in that it has a bottom 29 curved convexly to fit snugly into the concavity of the curved backbone panel 12 to which each one of the blocks will be fastened in axially-spaced relation to the other by a single rivet 32.

The saddle blocks 30 are preferably formed as zinc die castings having hollow portions 37 on the underside and teeth 34 adapted to dig into the backbone to prevent pivotal movement about the rivets.

Very important is the fact that each saddle block comprises a pair of respectively right- and left-hand, integrally-joined, convexly-curved saddles 34, 35, each situated at a substantial distance laterally of a long central reference axis Z—Z extending between the two blocks along the centers thereof through the rivet holes and the flat, intermediate gliding lands 31 therebetween (FIG. 6), the curvatures of each saddle being identical and matching the concave curvature of the appertaining prong plate 20 for nesting interfit therewith in the manner depicted in FIG. 4, with the guide studs 21 fitting respectively into the lateral guide slots 22 in the appertaining saddles to guide the carrier plates in gliding movement thereon in opening and closing movements of the prongs.

A further feature of importance is the provision of a simple operator-plate means for actuating the prong carriers in easy, smooth, and positive opening and closing movement on the divided saddle structure, such means being seen to advantage in FIG. 6 in the form of a single elongated stamping constituting operator plate 40 of generally dished cross section including individually curved opposite side wings 42 each having a curvature adapted to fit down upon a corresponding one of the curved carrier plates 20 on its saddle, there being a median depressed portion 41 extending the length of the operator plate (see also FIG. 3) which fits down closely upon the gliding land 31 formed between each saddle to seat the central portion 41 of the operator plate for longitudinal shifting movement. The actuating handle or lever 46 is an upset extension of the bottom wall of the central channel depression 41.

Depending from each curved side wing 42 of the operator plate near the opposite ends thereof are cam studs 44 respectively positioned to interfit with a corresponding underlying one of the cam-slot formations 23L or 23R in the appertaining carrier plate, such that longitudinal shifting back and forth of the operator plate in its gliding seat 31, as aforesaid, will cause said studs to be displaced in their respective cam slots and thereby shift the corresponding prong carriers laterally back and forth in angular gliding opening and closing excursions on the saddles.

The operator plate 40 is provided in said central guiding depression 41 with a pair of elongated slide slots 45 (FIGS. 3 and 6) respectively adapted to fit over a corresponding one of the saddle block rivets 32, the latter being fitted with suitable washer and headed over, as in FIGS. 2 to 4, to secure the entire assemblage of carrier and operator plates in interfitting, operative position on the saddle blocks.

In order to spread the prongs and open the rings the lever 46 is seized and pulled downwardly (FIG. 2) or outwardly (FIGS. 2 and 5) until it occupies the position illustrated in FIG. 3, wherein the cam pins 44 in forcing past the diagonal or pitched median portions 23M of the respective cam slots, will shift the carrier plates 20 outwardly away from each other and thereby separate the prongs 17, this movement being limited, other things being equal, by the dimensions of the cam slots and the length of the longitudinal slots 45 in the operator plate 40. The binder will also be partially locked in this open condition by disposition of the cam pins 44 in the opposite or upper endwise alleys 23E′ (FIG. 3).

For certain kinds of service the covers are provided with an adjustable clasp means such as shown in FIGS. 1 and 1–A, and comprising a loop 25 of flexible material such as rubber secured to the rear cover as at 25A and having a combination clamp block and hook means 26 near the loop and adapted to hook into a catch plate 27, having a plurality of spaced catch perforations 27A into any of which the hook may be caught.

In accordance with a modified construction illustrated in FIGS. 7 through 11, the basic principles of the described structural and functional embodiment, characterized by the provision of dual prong carriers each working on its own arcuate saddle at one side of a longitudinal center line (Z—Z) responsive to reciprocation of a common actuating plate, are all preserved, with the principal difference that a strengthening of the prong carriers is achieved by eliminating the cam slots therein and substituting cam pins therefor, and transposing the several cam slots to positions in the wings of the operator plate, the much larger area and reinforcing arcuate conformations of which leave the strength of this plate substantially unaffected by removal of the amount of metal necessary to form such cam slots.

The principal changes effected in construction of the modified form of binding mechanism are apparent from FIG. 9 wherein the saddle blocks 30X are seen to be substantially the same as those previously described with the exception of the elimination of the guide slots 22 and the addition of a latching projection 39 at the lower outer side of the saddle block for cooperation with a latching detent means provided on the operator plate. On the modified ring-carrying plates 20X, the pairs of cam slots 23 of the first embodiment are replaced by pairs of cam pins 44X staked-in at corresponding positions thereon to cooperate with appertaining cam slots 23X formed in the modified operator plate 40X; and in place of the pin-and-slot guide means 21–22 of the first embodiment, the slots 22 are replaced by twin pairs of guide pins 21X staked into the underside of each ring carrier in spaced relation to straddle the saddle block and thereby confine the carriers in their gliding arcuate movement over their respective saddles.

Figure 7:
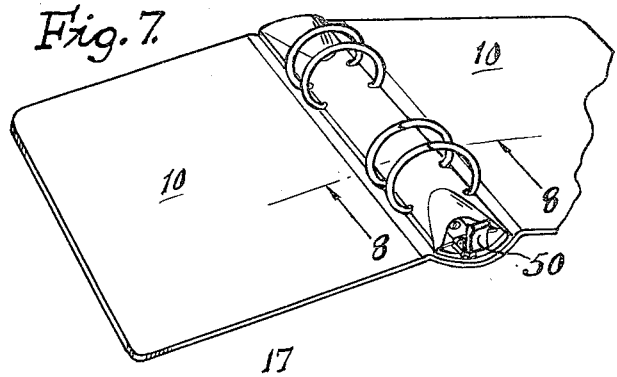
FIG. 7 is a fragmentary perspective detail of another binder employing a modified binding mechanism.
Figure 10:
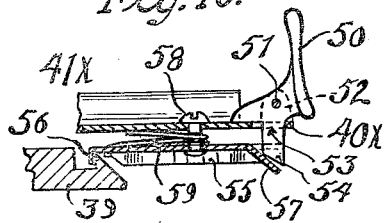
FIG. 10 is a fragmentary sectional detail of a combination actuating lever and latching mechanism.
Figure 8:
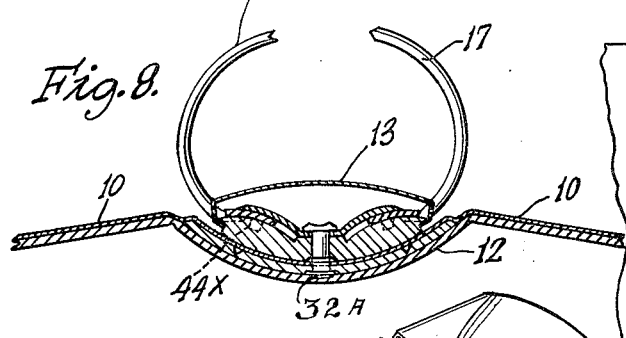
FIG. 8 is an enlarged vertical cross-sectional detail of the modified mechanism taken along lines 8—8 of FIG. 7, but showing the rings in open condition, and in elevation.

The modified form of the binding mechanism further includes a finger-operated latching means forming part of the actuating lever and generally indicated at 50 (FIGS. 7 and 10).

Referring to FIG. 10, said latch means includes a finger lever 50 pivoted on a pin 51 seated in a pair of upstanding ears 52 struck up on opposite sides of an extended end portion 41X of the operator plate 40X, there being an opening 53 punched through the end of this extension to pass the finger lever, the lower portion of which is beveled to form a cam 54.

Rockably carried on the underside of the extended portion 41X of the operator plate is an elongated channel-shaped detent member 55, one end of which is turned down to form a detent 56 adapted to latch into the locking lug 39 on the saddle, the opposite end of this detent member being angled to provide a complementary cam means 57 confronting, and cooperative with, the cam 54 on the finger lever.

The detent member is rockably carried on a depending pin 58 staked into the extended end of the operator plate and passing through the bottom of said member and headed over at its free end to retain therein a wire spring 59 acting between the pin head and channel piece so as to urge the latter in a way to dispose the detent 56 into the notch of the locking lug 39.

When the finger tab or lever of handle means 50 is grasped and pulled to open the binder prongs, the pressure against the lever 50 will rock same to thrust cam portion 54 against the camming end 57 of the channel member to rock the latter thereby lifting the detent 56 out of the notch in lug 39 to free the operator plate for full opening movement as in the operation described in view of FIGS. 2 and 3.

On closing of the rings the detent means automatically locks into the lug 39 without attention to the finger lever.

The backbone structure 12 is preferably of a laminated construction, the head portions 32A of the rivets being concealed between laminations to procure a blind attaching rivet for the saddle blocks 30.

The cover plate 13 is optional and preferably stamped from springy metal so that is may be snapped into and out of assembly with the saddle blocks owing to the provision of the downturned side flanges affording both a marginal shield and snap prongs 14 (FIGS. 4 and 6) thereon which grab beneath the notched ends 37 of the saddle blocks. Marginal ring-clearance slots 15 are provided in this cover plate to clear the lower portions of the binding rings, and serve also to contribute to the yieldability of the marginal flange and prong structure.

In respect to the binder shown in closed condition in FIG. 1 (and corresponding to the condition shown to larger scale in FIGS. 2 and 4), the actuating handle or lever 46 is disposed inwardly of, or above the foot of the backbone 12 in this condition so as to lie substantially within the confines of the book in order that the latter may be stood on end for shelving, etc.; and in such closed condition it will be observed in FIG. 2 that the cam pins or studs 44 are disposed in the lower endwise locking alleys 23E in their respective cam slots.

I claim:

1. In a loose-leaf binding mechanism of the type employing binding prongs in mating pairs adapted to close together to form a binding ring, in combination: a pair of elongated, laterally-arcuate prong-carrying plates, each of said plates having affixed thereto a series of said prongs and the prongs on one said prong plate each comprising one of a said pair for which the companion prong is carried on the other said prong plate; means providing sets of at least two arcuate saddles on each side of a longitudinal reference axis each set supporting one prong plate such that each prong plate can glide thereon in the general direction of its own arc of curvature located on one side of said axis toward and away from the other said plate each arc having its center of curvature on the corresponding side of said axis to close mating prongs together or separate the same into open condition; and an elongated operator plate curved laterally to fit upon both prong plates and slide thereon in the general direction of said axis, together with means on said prong and operator plates drivingly intercoupling the same for coaction such that sliding of the operator plate in one said direction will move the prong plates laterally to separate said prongs, and in the opposite direction will move the prong plates to close the prongs.

2. Mechanism according to claim 1 in which the curvature of said saddles and the appertaining prong plates is convex, and said operator plate has two convexly arcuate wing portions along opposite longitudinal sides thereof each interfitting with one of said prong plates to glide lengthwise thereon in the direction of the reference axis as aforesaid.

3. Mechanism according to claim 2 in which said saddles comprise at least two saddle blocks spaced apart along said axis and extend laterally crosswise thereof, and each said block has two arcuate lands each constituting a saddle, one on either side of said reference axis, and each saddle land joined to the other by a depressed central land.

4. The construction of claim 3 further characterized in that said operator plate is provided with a central, channel-like portion extending lengthwise thereof in parallelism with said reference axis and slidably seating upon said lands of the saddle blocks, together with pin and slot means at said channel-like portion and lands for securing all of said plates in assembly with the saddle means for cooperatively movable relation as aforesaid.

5. Mechanism according to claim 4 further characterized in that said saddle blocks each have a convexly arcuate bottom portion and are respectively secured in the concavity of the curved backbone of a set of binder covers by said pin means engaged also in said backbone, the latter being of a length in the direction of said axis greater than the length of said operator plate, and the operator plate having a longitudinally-extensive handle projection at an end thereof and of a length to lie inwardly of the most adjacent end margin of the backbone when the operator plate is moved to that position corresponding to the closed condition of the prongs.

6. In a binding mechanism a pair of elongated prong carriers laterally curved convexly upward with sets of mutually mating prongs projecting upwardly therefrom; and sets of at least two upwardly convexly-curved saddles arranged in alignment with their arc centers disposed on opposite sides of a central reference axis relative to which said prongs converge to close together; each of said carriers seating slidably on an appertaining set of saddles on one side of said axis; elongated operating means having opposite longitudinal, laterally-curved wings, each fitting slidably on one of said carriers to reciprocate in the direction of said axis; and means drivingly interconnecting said carriers and operating means such that longitudinal reciprocation of the latter effects lateral shifting of the carriers to open and close the mating prongs.

7. In a binding mechanism, a pair of elongated, carrier plates each having prong means thereon adapted to be moved toward the prong means on the other for opening and closing binding action responsive to corresponding sidewise arcuate shifting of said carrier plates toward and away from each other laterally of their length and a longitudinal reference axis; and means providing at least two axially separated saddle lands situated on opposite sides of said reference axis and each having a center of curvature offset from said axis mounting said carrier plates in parallelism with each other and said axis for lateral shifting as aforesaid; and means seating upon said carrier plates and reciprocably slidable lengthwise of said axis having driving interconnection with the carrier plates for shifting the same laterally toward or away from each other for the purpose aforesaid.

8. In a loose leaf binding mechanism, sets of at least two separate and convexly curved saddle structures situated on each side of a central axis with the respective centers of curvature thereof offset from said axis, and an elongated prong plate having concave bottom portions and each glidingly seated on a set of said saddle structures to shift laterally of said axis thereon, each said plate having binding prongs cooperable in binding action with like companion prongs on the other said plate responsive to lateral shifting of said plates toward and away from said axis; and an actuating member reciprocable along said axis and having driving interconnection with each of said prong plates to shift the same jointly toward and away from said axis for the purpose set forth.

9. In a binding mechanism of the split-prong type, a pair of elongated prong-carrying plates each curved laterally with prong members projecting upwardly in the direction from the convex side thereof; means mounting said plates on opposite sides of a central reference axis parallel to their length for arcuate lateral shifting toward and away from said axis to open and close mating pairs of said prongs, said means comprising at least two saddle members fixed in spaced positions along said axis and elongated laterally to lie on opposite sides of said axis and having a center of curvature offset from said axis, each saddle member having two arcuate lands respectively spaced on an opposite side of said axis from the other with a substantially flat land intervening between portions of the appertaining arcuate lands which are proximate to said axis, said intervening land containing said axis; each prong-carrying plate resting upon the arcuate lands of the saddle members which are disposed on the same side of said axis to glide laterally toward and away from said axis; and an elongated operator plate having a longitudinally-extending, laterally-curved wing along each of its opposite longitudinal sides, and joined by intervening web portions adapted to overlie said interconnecting lands of the saddles, and said wings being respectively adapted to fit glidingly upon one of said prong-carrying plates in assembled relation with the saddle members as aforesaid and being shiftable back and forth along said axis; means drivingly interconnecting each prong-carrying plate with said operator plate such that back and forth movement of the latter will shift the prong-carrying plates correspondingly toward and away from each other and said axis to open and close the prong sets; and means passing through the intervening lands and web portions for engagement with said saddle structure, at least, to secure the operator plate in operative assembly with said prong-carrying plates and saddle structures.

10. In a loose-leaf binding mechanism, a pair of arcuate elongated prong-carrying plates and means mounting the same to shift laterally on appertaining arcs which have their centers of curvature respectively located on corresponding sides of a central reference axis; and an elongated operating plate having an arcuate wing along each longitudinal side thereof; each wing nesting slidably upon one of said prong-carrying plates and having a driving interconnection therewith such that longitudinal movement of the plate back and forth will produce corresponding lateral shifting of the prong-carrying plates toward and away from each other, for the purpose of closing and opening the binding prongs.

References Cited by the Examiner
UNITED STATES PATENTS

| | | | |
|---|---|---|---|
| 2,024,461 | 12/35 | Lotter | 129—9 |
| 2,075,766 | 3/37 | Rand | 129—9 |
| 2,075,767 | 3/37 | Rand | 129—9 |
| 2,211,546 | 8/40 | Rabinof | 129—9 |

WALTER A. SCHEEL, *Primary Examiner.*

LAWRENCE CHARLES, JEROME SCHNALL, ROBERT PULFREY, *Examiners.*